United States Patent
Trudeau

(10) Patent No.: US 6,975,246 B1
(45) Date of Patent: Dec. 13, 2005

(54) COLLISION AVOIDANCE USING LIMITED RANGE GATED VIDEO

(75) Inventor: Tim K. Trudeau, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 183 days.

(21) Appl. No.: 10/436,695

(22) Filed: May 13, 2003

(51) Int. Cl.[7] .............................. G08G 1/16; B60T 7/16
(52) U.S. Cl. ...................... 340/903; 340/435; 340/555; 180/167; 180/168; 382/103; 382/106; 342/455; 348/135; 701/301
(58) Field of Search ................................ 340/903, 961, 340/435, 438, 555, 557; 180/167, 168, 169, 180/271, 274; 382/103, 106; 348/135; 342/455, 342/357; 701/301, 302; 356/3

(56) References Cited

U.S. PATENT DOCUMENTS

| | | | |
|---|---|---|---|
| 5,448,233 A | 9/1995 | Saban et al. ................. | 340/963 |
| 5,581,250 A | 12/1996 | Khvilivitzky ................ | 340/961 |
| 5,631,640 A | 5/1997 | Deis et al. ................... | 340/961 |
| 6,489,922 B1 * | 12/2002 | Lin et al. ................ | 342/357.14 |
| 2002/0147534 A1 * | 10/2002 | Delcheccolo et al. ......... | 701/45 |
| 2003/0001772 A1 * | 1/2003 | Woodington et al. ......... | 342/70 |

* cited by examiner

Primary Examiner—Donnie L. Crosland
(74) Attorney, Agent, or Firm—RatnerPrestia

(57) ABSTRACT

A collision avoidance system for a vehicle includes a collision avoidance processor, and an active sensor for obtaining successive range measurements to objects along a path transversed by the vehicle. The active sensor includes a near range gate for obtaining a near range measurement to objects located at a range less than a first predetermined range, and a far range gate for obtaining a far range measurement to objects located at a range greater than a second predetermined range. The near and far range measurements are provided to the collision avoidance processor for maneuvering of the vehicle.

20 Claims, 11 Drawing Sheets

COLLISION AVOIDANCE USING LIMITED RANGE GATED VIDEO

FIELD OF THE INVENTION

The present invention relates, in general, to collision avoidance and, more specifically, to collision avoidance using a range gated camera.

BACKGROUND OF THE INVENTION

A vehicle often requires knowledge of its environment. This may be accomplished by integrating information derived from multiple onboard navigation sensors, such as a GPS (Global Positioning System) receiver, an IMU (Inertial Measurement Unit), an altimeter, etc. Using such sensors, the vehicle may obtain its own position, velocity and acceleration information. Information of obstacles in the path of the vehicle may also be obtained using onboard target tracking sensors to derive position and bearing information of targets proximate to the vehicle.

By optimally integrating navigation sensors and target tracking sensors, guidance laws may be used to generate a desired trajectory for the vehicle.

Generally, target tracking sensors produce range measurements of a target with respect to the vehicle by using an active sensor, such as a radio or acoustic radar or a laser range finder. The operation of an active sensor depends on measurement of the traveling time between the transmitted signal and the received reflected signal.

In various scenarios it is desirable to maneuver unmanned aerial vehicles (UAVs) into areas for surveillance and reconnaissance. One scenario may include a low flying UAV with hover capability, navigating through a wooded area under a tree canopy. Another scenario may include a UAV with hover capability, navigating in a cave and sharply maneuvering to avoid collision with a wall. Providing autonomous collision avoidance for such a UAV is desirable by using an onboard camera having intensified video.

One advantage of using an intensified camera is the ability to gate the intensifier. Gating provides a mechanism to gather range information that may be used to form spatial three-dimensional (3D) knowledge about a region the vehicle is maneuvering through. Potential collision obstacles may be located, relative to the sensor, within the 3D space-of-regard.

When attempting to traverse a space where obstacles prevent a straight-line path, the limiting factor becomes the accuracy with which objects may be located. A range-gated camera may be used with extremely narrow range gates to locate objects in the space. This approach fails, however, if the spatial separation between obstructions becomes less than the illuminator pulse width, times one half the speed of light. In a scenario of a UAV navigating through a wooded area or a cave, the separation between obstructions may be on the order of 2 feet, thus requiring an illuminator pulse of less than five nanoseconds (ns). Acquisition of a small, low cost illuminator with a pulse width this short, and with enough intensity to generate a usable image, presents a major hurdle in developing a low cost UAV with collision avoidance. A different approach is, therefore, needed.

The present invention addresses a collision avoidance system using a gated camera sensor, which does not require the illuminator to be high performance.

SUMMARY OF THE INVENTION

To meet this and other needs, and in view of its purposes, the present invention provides a collision avoidance system for a vehicle having a collision avoidance processor, and an active sensor for obtaining successive range measurements to objects along a path transversed by the vehicle. The active sensor includes a near range gate for obtaining a near range measurement to objects located at a range less than a first predetermined range, and a far range gate for obtaining a far range measurement to objects located at a range greater than a second predetermined range. The near and far range measurements are provided to the collision avoidance processor for maneuvering of the vehicle.

In another embodiment, the invention provides a method of collision avoidance for a vehicle including the steps of: (a) measuring a near range to objects located at a range less than a first predetermined range; (b) measuring a far range to objects located at a range greater than a second predetermined range; (c) steering the vehicle in response to the objects located at the range greater than the second predetermined range; and (d) modifying step (c) in response to the objects located at the range less than the first predetermined range.

In yet another embodiment, the invention provides a method of collision avoidance for a vehicle including the steps of: (a) imaging a scene located at a first predetermined range; (b) imaging a scene located at a second predetermined range, the second predetermined range being greater than the first predetermined range; (c) locating at least one low density region in the scene imaged at the second predetermined range; (d) selecting a low density region from the low density regions located in step (c), and using the selected low density region as a steering aim point for the vehicle; and (e) modifying at least one of direction and velocity of the vehicle, while being steered toward the steering aim point, to avoid objects located at the first predetermined range.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following FIGS..

DETAILED DESCRIPTION OF THE INVENTION

Objects in a scene may be placed in 2D space using spherical coordinates, theta and phi. In order to determine position in the third dimension, rho (or range) is also required. Extracting accurate range information using a range gated camera is problematic due to limitations of the illuminator, with cost tending to increase with increases in resolution. The higher the desired range accuracy, the shorter the required illuminator pulse width.

The invention provides two special cases where range resolution is not a function of the illuminator pulse width. These special cases are at minimum range (0 to $R_{min}$) and at maximum range ($R_{max}$ to $R_\infty$). These two ranges are referred to herein as $R_1$ and $R_2$, respectively, and described below.

Figure 1:
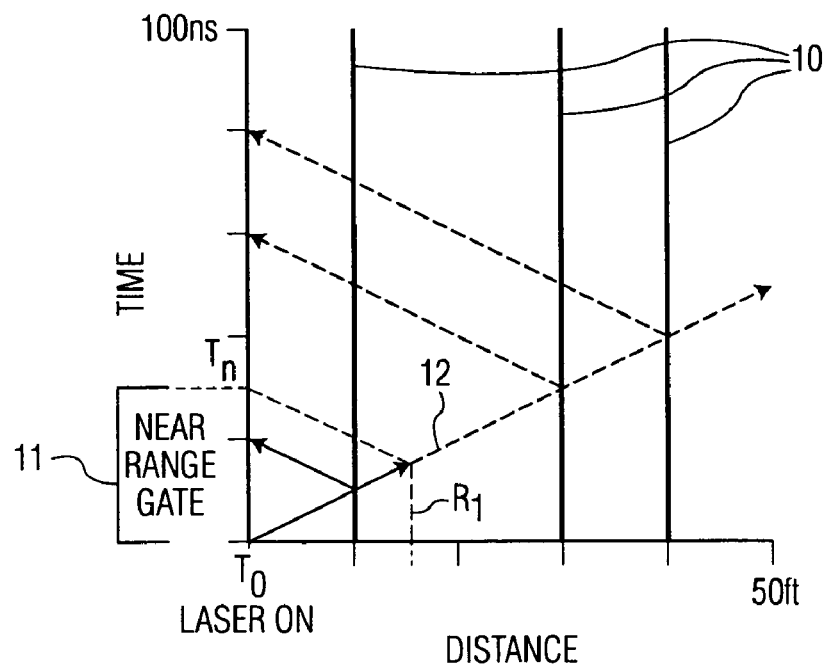
FIG. 1 is an illustration of a path of a leading edge of a laser pulse impinging upon and reflected from multiple obstacles with a camera range gate positioned at a near range, in accordance with an embodiment of the invention.

When imaging at the minimum range, camera gating (or an intensifier in the case of $I^2C$ systems) may be used to limit $R_1$. FIG. 1 illustrates near range gating. The bars marked 'reflectors', generally designated as 10, are objects in the field of view (FOV). They may be thought of as one-dimensional objects persistent in time. Arrows 12 represent a light ray traveling down range, plotted against time. The leading edge of the illuminator (laser) wave front and the opening of camera gate 11 are coincident in time at $T_0$. After 20 nanoseconds (ns) (for example), the wave front leading edge travels 20 feet out in front of the illuminator/camera. Objects within this range are illuminated, producing a reflected wave front that travels back to the camera. Objects beyond 20 feet are not yet illuminated. By 20 ns an object positioned at 10 feet produces a reflected ray that is just reaching the camera. Since camera gate 11 is still open, this object is recorded by the camera. Shortly after 20 ns, the camera gate is shut. Ray 12 continues to travel down range and reflect off distant objects. Any object more distant than $R_1$ is not recorded, because the reflected ray arrives back at the camera after time $T_n$, the time at which camera gate 11 is closed. The timing of the camera shutter, thus, determines the range at which objects are visible.

The illuminator pulse may be arbitrarily large. The camera ignores light reflected off objects at ranges greater than $R_1$. The range, $R_1$, is defined by the present invention as follows:

$$R_1 = (T_n - T_0)c/2$$

where c is the speed of light, $T_0$ is the time the illuminator fires, and $T_n$ is the time that range gate 11 is closed.

Figure 2:
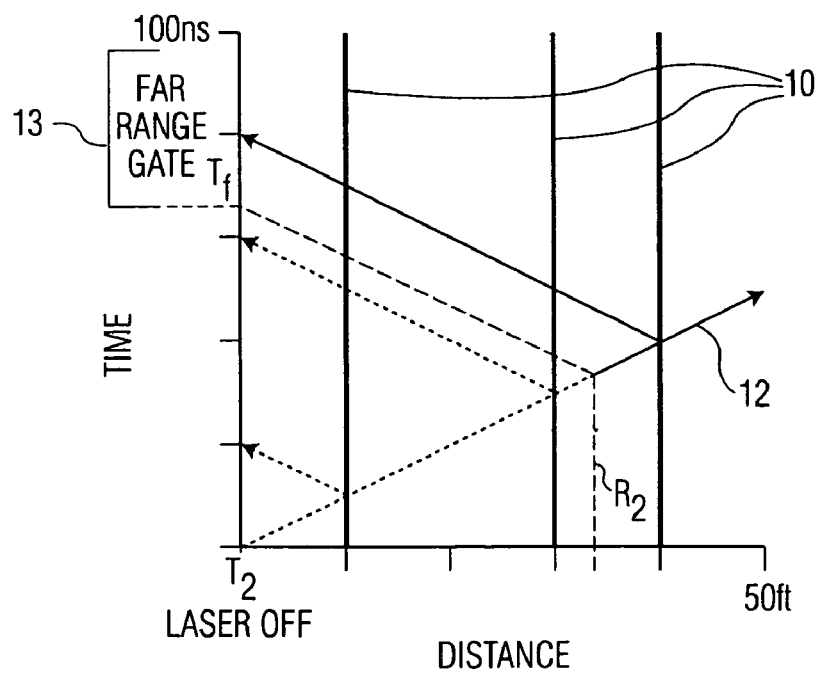
FIG. 2 is an illustration of a path of a trailing edge of a laser pulse impinging upon and reflected from multiple obstacles with a camera range gate positioned at a far range, in accordance with an embodiment of the invention.

FIG. 2 illustrates far range gating at maximum range. The range, $R_2$, is defined by the present invention as a difference between the maximum range at which the illuminator may produce a usable image ($R_\infty$), and an optimal delta range of interest, as follows:

$$R_2 = R_\infty - R\Delta$$

where $R\Delta$ is a desired depth of field.

The camera is gated on (intensifier enabled) at $2R_2/c$ seconds, after the end of the illuminator pulse, or $T_f$. The illuminator is shut off at time $T_2$, which results in a wave pulse trailing edge. Since the illuminator pulse width, defined by $(T_2 - T_0)$ may be arbitrarily large, it will be appreciated that at time $T_2$ objects at all ranges (out to $R_\infty$) return as reflected rays 12.

At $\Delta T = T - T_2 = 40$ ns (for example), the wave pulse trailing edge is just reaching object 10 at 40 ft, as shown in FIG. 2. By $\Delta T = 60$ ns (for example), all rays reflected by objects out to 30 ft are returned to the camera. Since camera range gate 13 is not yet opened, these early arriving rays are not recorded by the camera. At $T_f = 65$ ns (for example), the range gate is opened. Reflected ray 10 from object 10 at 40 ft arrives at the camera, while range gate 13 is open, at $\Delta T = 80$ ns, and is recorded by the camera. In fact, at $T_f$ all objects at ranges between $R_2$ and $R_\infty$ have returning rays, all of which are recorded. $R_2$ may be written as follows:

$$R_2 = (T_f - T_2)c/2$$

where $T_f$ is the time the range gate is opened, and $T_2$ is the time the illuminator is shut off.

$R_\infty$ is limited by both the amount of flux returning from objects 10 at $R_\infty$ and the on time duration of the camera gate. $R_2$ is a function of the timing $(T_f - T_2)$. Again, the illuminator pulse width may be arbitrarily large. For both $R_1$ and $R_2$ the range and range resolution, in an embodiment of the invention, is determined by the timing of camera range gates 11 and 13, not the illuminator pulse width.

Figure 3:
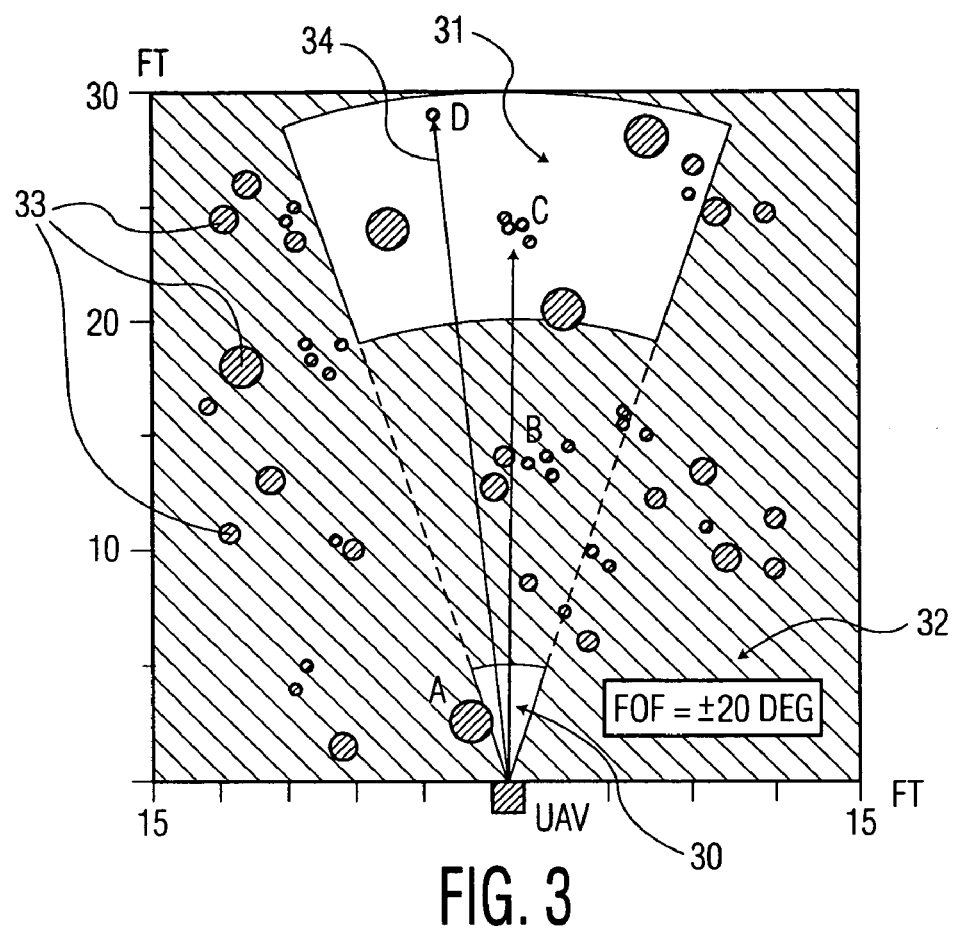
FIG. 3 is an illustration of a typical two-dimensional (2D) space containing obstacles of various sizes that are observable in a field of view (FOV) at near range and far range, and are not observable in between the near range and far range, in accordance with an embodiment of the invention.

Having shown a manner in which limited range gated video (LRGV) information may be acquired by the invention, examples of how this incomplete, two-dimensional image data may be used to perform collision avoidance will be shown next. Referring now to FIG. 3, there is shown an exemplary space containing obstacles, such as plurality of trees 33 of various sizes. The observable regions, defined by $R_1$ (near range) and $R_2$ (far range), are shown as 30 and 31, respectively. The shaded region, designated generally as 32, is not visible. The field-of-view (FOV) of the camera is shown as ±20 degrees (for example).

Figure 4:
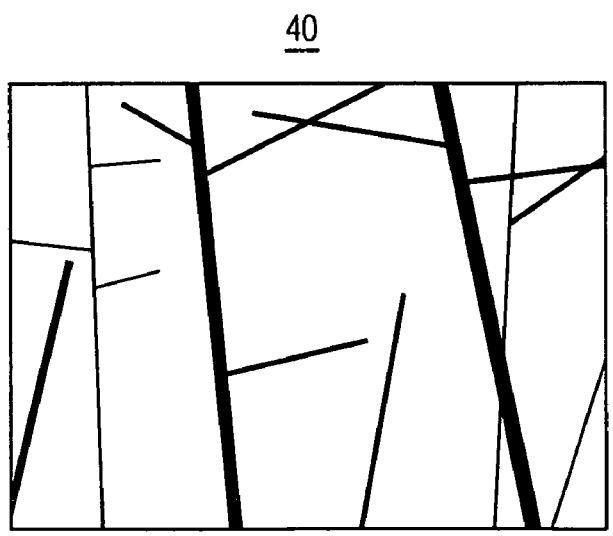
FIG. 4 is a far range image taken with a camera at a far range, in accordance with an embodiment of the invention.

Referring next to FIG. 4, there is shown far range image 40 looking through trees (obstacles) recorded with a range-gated camera at range $R_2$. This range $R_2$ is determined by the time interval between the end of the illuminator wave pulse and the opening of the camera shutter (as previously explained). $R_2$ is 20 ft, as shown (for example), and at approximately 30 ft (for example) the returning wave front is too weak to provide an additional signal. As a result, $R\Delta$ (the depth of field) in this example is 10 ft. In addition for explanation purposes, an assumption is made that the autonomous vehicle is sufficiently maneuverable, so that objects 20 ft away do not pose an imminent danger of collision. It will be appreciated that FIG. 4 provides little range information, other than objects in the scene are at least 20 ft away, and thus are not collision hazards. FIG. 4 also provides an aim point in 2D space having a minimum amount of obstructions i.e. minimum scene density. The navigator (discussed later) may assign this point, located at $R_2$, as a current local goal, or a current target aim point. The image at $R_2$ does not provide near range avoidance information, but does provide an aim point toward spots in the far field having low probabilities of encountering obstacles (i.e. have a low scene density).

Figure 5:
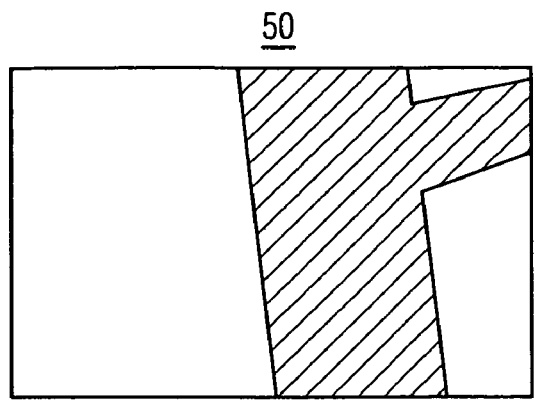
FIG. 5 is a near range image taken with a camera at a near range, in accordance with an embodiment of the invention.

FIG. 5 illustrates near range image 50, taken at range $R_1$. The obstruction shown may be at a range between 0 ft and $R_1$. $R_1$ is determined by the time interval between the start of the illuminator wave front and the closing of the camera shutter, as explained previously. If this is the first frame in which the obstruction is detected, and if the frame rate is sufficiently high compared to the rate of forward motion, then the obstruction is located at exactly $R_1$. If, for example, $R_1$ is 5 ft, then the vehicle is in imminent danger of a collision. If the vehicle is capable of coming to a complete stop within 5 ft, this object is avoidable.

Since limited range gated video only provides Information about objects at near range and far range, the existence of objects between $R_1$ and $R_2$ are not known. Objects in the near range seem to suddenly appear as the vehicle moves forward. If complete information about the obstructions in the space of regard is known, navigation becomes easier, because the further away an obstruction is detected, the smaller the course correction required to avoid the obstruction.

Figure 6A:
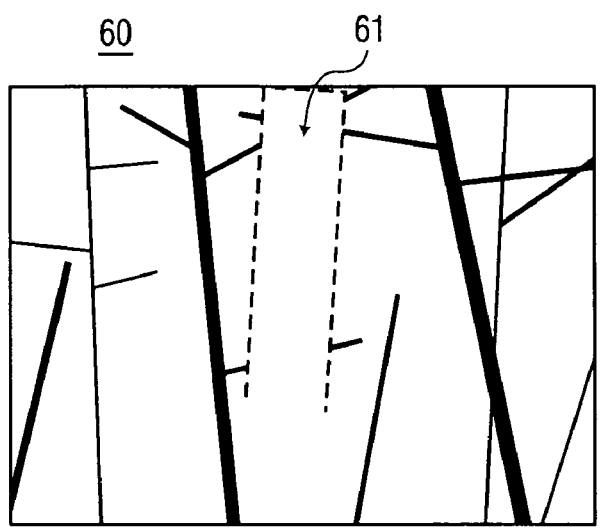
FIG. 6A is a far range image taken with a camera showing an intervening mid range obstruction, in accordance with an embodiment of the invention.

Collision avoidance using information limited to objects at near range and far range, or limited range gated video (LRGV) is discussed next. A drawback to LRGV is that objects in mid-range are not visible and may obscure (shadow) objects in the far range. FIG. 6A illustrates this point. Image 60 shows the same scene as the scene in FIG. 4, but with a mid range obstruction shadowing the tree limbs in region 61. This gives a false indication of region 61 being a clear region. Generally, choosing a point in the far range, although showing no far range obstructions may, nevertheless, result in a path having a likelihood of mid range obstruction. This may be seen in FIG. 3. As shown, the cluster of trees at point C of region 31 is hidden by obstructions at point B of region 32. A first order 'apparently optimal' course vector may have a high probability of ending on a mid range obstruction at point B of region 32. To reduce this probability, a second order strategy may be used. The navigator may track an object in the far range and use this object as an aim point (for example point D in region 31 of FIG. 3). The visibility of point D along track 34 assures that point D is not being shadowed by a mid field obstruction. Point D may be chosen as the aim point that lies in a region of minimal far field obstructions, i.e. minimal scene density.

Figure 6B:
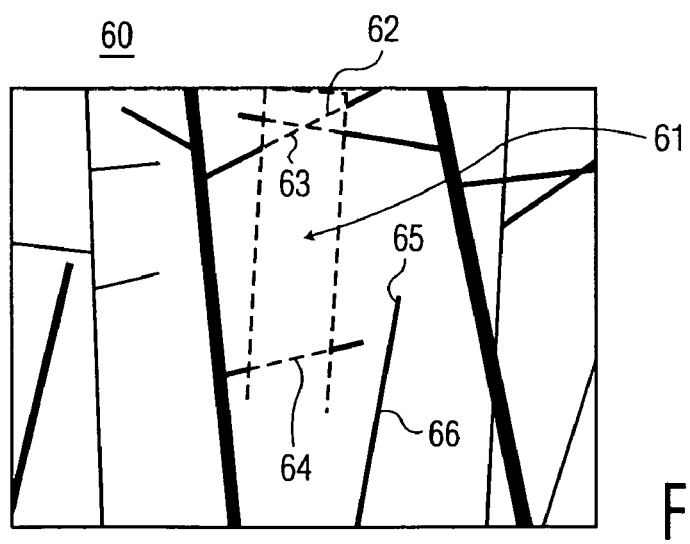
FIG. 6B is an illustration of the mid range obstruction of FIG. 6A identified using missing line interpolation, in accordance with an embodiment of the invention.

In addition, objects in both natural and man made environments, tend to be defined by straight edges. A hidden line interpolation routine may be used by the navigator to identify shadowed regions. As shown in FIG. 6B, interpolations of lines 62, 63 and 64 may be constructed in region 61 in order to complete the hidden lines that are shadowed by an obstacle in mid range. Using this interpolation technique, it is possible to obtain information about objects in mid range.

Again, selecting a point on a visible object in the far field at least insures that there is nothing between the sensor and that point. If this point is also in a region with few or no interrupted edges (for example, point 65 of line 66 in FIG. 6B) then the probability of mid range obstructions is further reduced. When the aim point object passes from the far field to the mid-field, it is lost and a new far field object needs to be chosen. It is unlikely, however, that the new aim point lies on the same heading as a previous aim point.

As an alternative, when the surroundings are complex, an imager having an ability to vary $R_1$ permits the navigator to successively image the near field (near range) using stepwise increasing range. This capability allows the mid range uncertainty to be reduced to near zero. Providing for an adjustable $R_1$, it will be appreciated, requires a programmable gate on the imager shutter (or $I^2C$ intensifier).

It is not possible to guarantee that a local path vector does not end on a mid range obstruction. In one embodiment, therefore, the invention provides a method for navigating around close obstructions, in order to overcome this limitation. In addition, position of objects encountered by a vehicle may be dynamic, or varying in time. A robust navigator may be provided by the invention, which is capable of navigating around a dynamic obstruction injected into the path at close range (discussed below). Furthermore, lack of mid range information does not add significant complexity to the navigator, if a robust solution is available for navigating around obstructions injected into the path at close range.

A method for short-range collision avoidance in a dynamic environment is discussed next. One method for collision avoidance in a dynamic environment is disclosed in an article by D. Fox, W. Burgard and S. Thrun, titled "The Dynamic Window Approach to Collision Avoidance", published by IEEE Robotics and Automation Magazine, 4(1), at pages 23–33, dated March 1997, which is incorporated herein by reference in its entirety. As disclosed therein, a dynamic window (DW) is a computable model of a robot's environment in which trajectory curvatures are searched to minimize the distance to a local goal (a local target). Kinematic constraints are taken into account by directly searching a velocity space of the robot vehicle. The velocity space is defined by a set of tuples $(v,\omega)$ of longitudinal and rotational velocities achievable by the robot. Acceptable velocity tuples are selected from a set of possible tuples which satisfy a condition that the robot vehicle be able to stop before it reaches an obstacle. To determine the next motion command to the vehicle, these acceptable velocity tuples are considered. From these, a velocity tuple is selected that maximizes an objective function. In general, this objective function is a linear combination of three goal-driven considerations given by:

$$G(v, \omega) = \text{Max}[K_1 * \text{head}(v, \omega) + K_2 * \text{avoid}(v, \omega) + K_3 * \text{vel}(v, \omega)]$$

The heading function in the above equation is the alignment of the vehicle's heading to that of the current local goal. The avoidance function in the equation is the miss distance to obstacles in the near image, and the velocity function in the equation is used to maintain the highest possible vehicle velocity while still avoiding obstacles. Constants $K_1$, $K_2$, and $K_3$ are weighting factors for these three functions.

The heading and velocity functions are given by:

$$\text{head}(v, \omega) = 1 - |\Theta|/\pi,$$

where $\Theta$ is the angle between the vehicle heading and the local goal, and $$\text{vel}(v, \omega) = v/v_{max}$$

The avoidance function produces a set of acceptable velocity tuples. One method for reducing the search space is by defining the DW as the velocity space which the robot vehicle may reach within the next time interval, given its current velocity $(v, \omega)$ and its acceleration capability $(\dot{v}, \dot{\omega})$.

The LRGV of the invention provides a DW produced at R1, which may be very restricted. As a result, the number and values of acceptable velocity tuples for collision avoidance may be selected in advance. When selecting velocity tuples toward local goals in the R2 image, imminent collision avoidance need not be considered and the number of acceptable velocity tuples may be reduced to provide a 'turn to a point'.

Figure 7A:
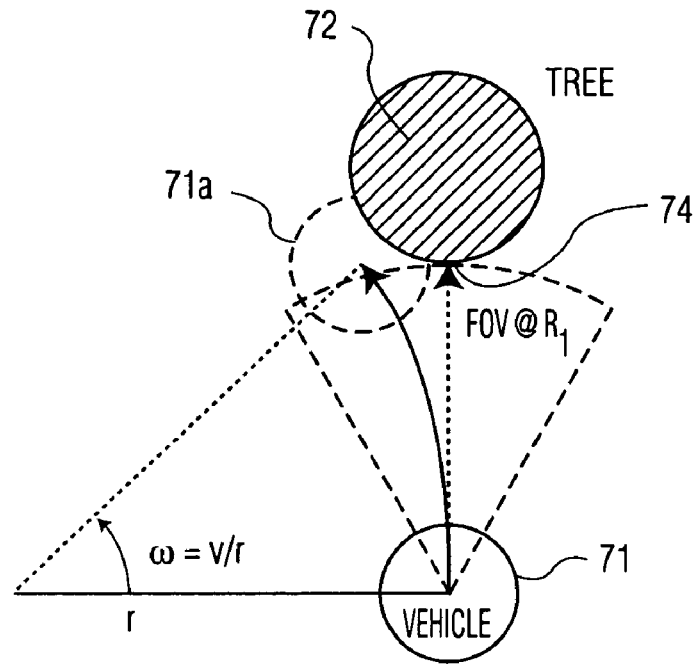
FIG. 7A is an illustration of a typical collision avoidance path taken by a vehicle having a camera imaging a scene at a near range, in accordance with an embodiment of the invention.

FIG. 7A shows vehicle 71 performing a typical turning maneuver to avoid tree 72. The tree first comes into view as a point at range $R_1$, designated as 74. Since this point of first detection is all the information obtained so far about the obstacle, a velocity tuple may be chosen which allows this point to just be missed (selection of a velocity tuple that maneuvers the vehicle from 71 to 71a, as shown). Subsequent course corrections may be made to fully avoid colliding with the tree. Choosing a new velocity tuple at the next time interval may be problematic, because the tree appears as a 2D flat surface at an indeterminate range between zero and $R_1$. To solve this problem, a small set of predetermined tuples may be used as a search space.

Figure 7B:
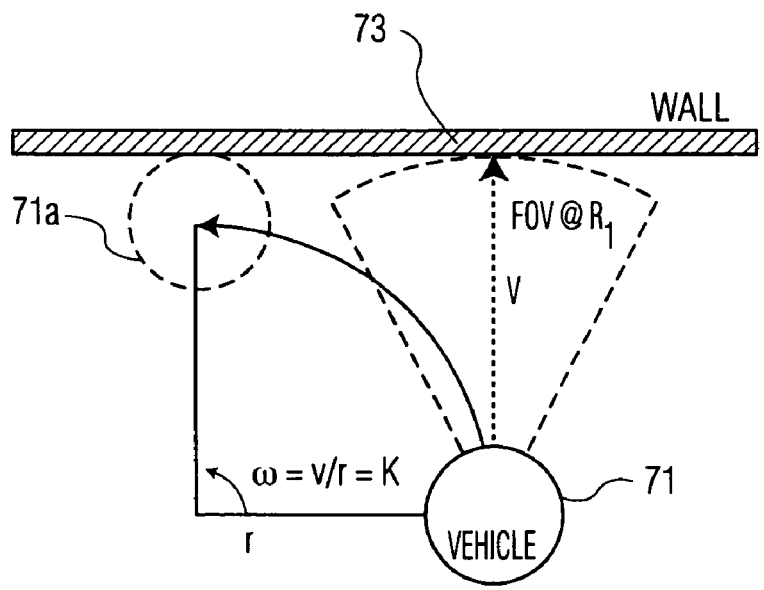
FIG. 7B is an illustration of a critical collision avoidance path taken by a vehicle having a camera imaging a scene at a near range, in accordance with an embodiment of the invention.

FIG. 7B shows an extreme case of vehicle 71 turning to avoid wall 73, which is much wider than the field of view. Here, r and w may be fixed at some velocity v, determined by the vehicle's maneuvering limitations. Thus, for a given v there are only two optimal tuples, both having the same magnitude for w but with different signs. The tuple selection criteria are thus reduced to simply turning either left or right. If the vehicle turns left, as shown, it moves toward 71a and avoids collision with wall 73.

Figure 8A:
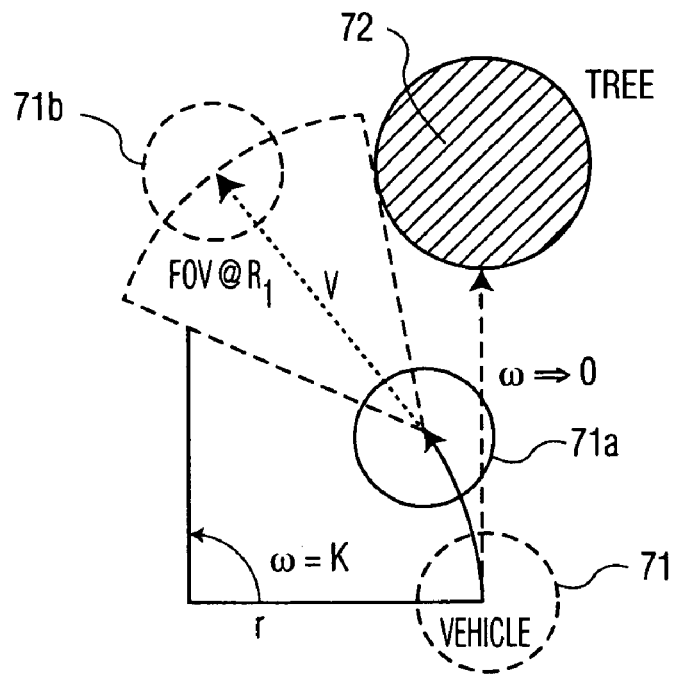
FIGS. 8A and 8B are illustrations of collision avoidance paths taken by a vehicle having a camera imaging a scene at a near range, in which the turning velocity of the vehicle returns to zero, when the FOV is clear of obstruction, in accordance with an embodiment of the invention.
Figure 8B:
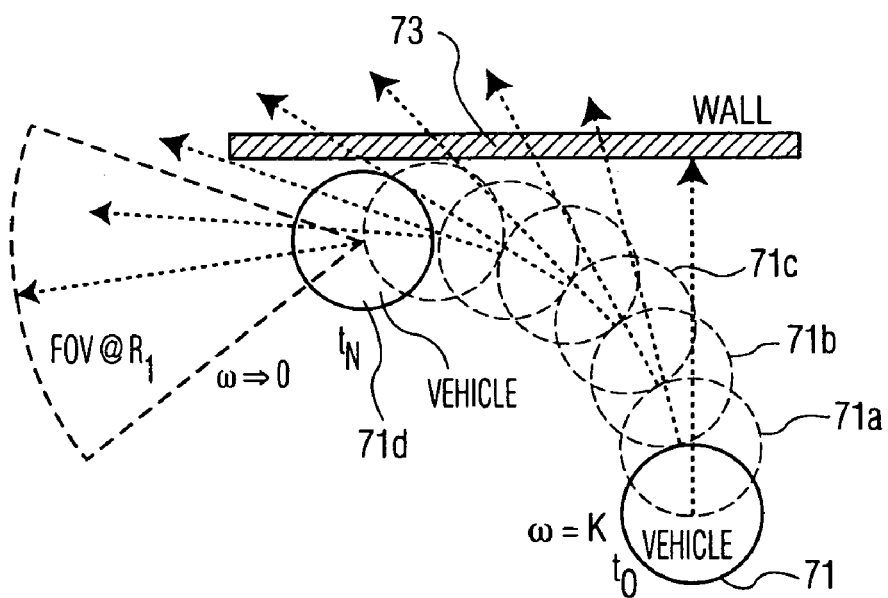

When an object comes into view, the collision avoidance processor (discussed later) may initiate a turn. While turning, the vehicle may under-go an angular displacement, $\Delta\Theta$, such that the video image stays centered on the vehicle's velocity vector. The sign of w may be chosen based on where the object appears in the image. An object in the left half of the image may initiate a turn to the right, and visa versa. The turn may be maintained at a constant radius until the field of view (FOV) is clear of objects. This is illustrated in FIGS. 8A and 8B.

If the obstruction is centered in the image, than the direction of the turn may be chosen to minimize the heading difference to the local goal. A narrow object, such as tree 72 in FIG. 8A, results in a minor course change, as shown. A wide obstruction, such as wall 73 in FIG. 8B, results in a major course change possibly exceeding 90 degrees. Once the collision is avoided, w may be returned to zero by the collision processor. At time to, w is equal to K; and at time tN, w is returned to zero, as shown. w may be held at zero until either a new obstruction is detected or the vehicle moves a distance equal to $R_1$. The local goal processor (discussed later) may then be allowed to set a course to a new local goal. Local goals may be chosen so that progress is made toward the global goal. If a new obstruction comes into view before the first obstruction cleared, then the navigator may determine if the current velocity tuple, or turning radius, will clear the new object.

Figure 9A:
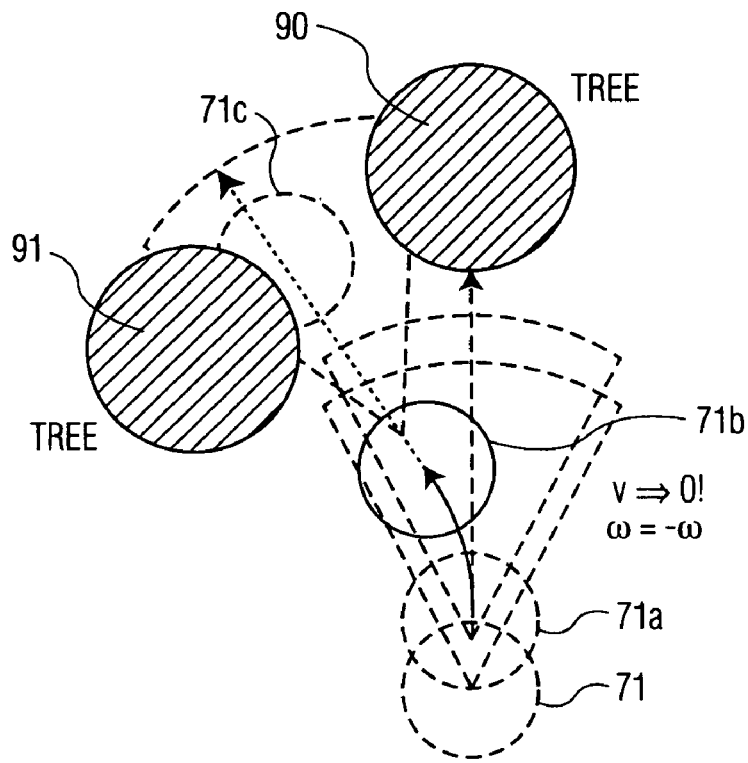
FIGS. 9A and 9B are illustrations of collision avoidance paths taken by a vehicle having a camera imaging a scene at a near range, in which the velocity of the vehicle approaches zero and the turning velocity of the vehicle changes direction in order to avoid obstructions, in accordance with an embodiment of the invention.
Figure 9B:
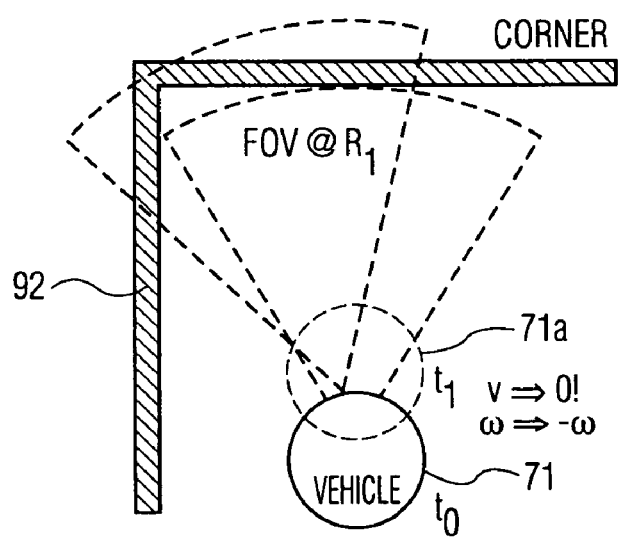

Referring now to FIGS. 9A and 9B, if any obstruction obscures an edge of the FOV, on the side being turned to by the vehicle, then that obstruction is determined to be unavoidable. In this case, v may be decreased to a minimum value, possibly zero. The rate of the angular displacement, $\Delta\dot{\Theta}$, may remain constant, but its sign changes. FIG. 9A shows this condition for two trees designated 90 and 91. It is not possible to determine if the space between the trees is passable because the distance to the left tree is indeterminate. In this case, the vehicle may reverse its turn direction and reduce its turning radius to zero (or near zero) by reducing v. As before, the vehicle may continue turning until there are no obstructions in the FOV. FIG. 9B generalizes this situation with corner wall 92. At time $t_1$ the entire FOV (and specifically the left edge) is shown obscured by corner 92. Therefore, the vehicle may determine that a stop, and a turning direction reversal is a good steering choice.

Figure 10A:
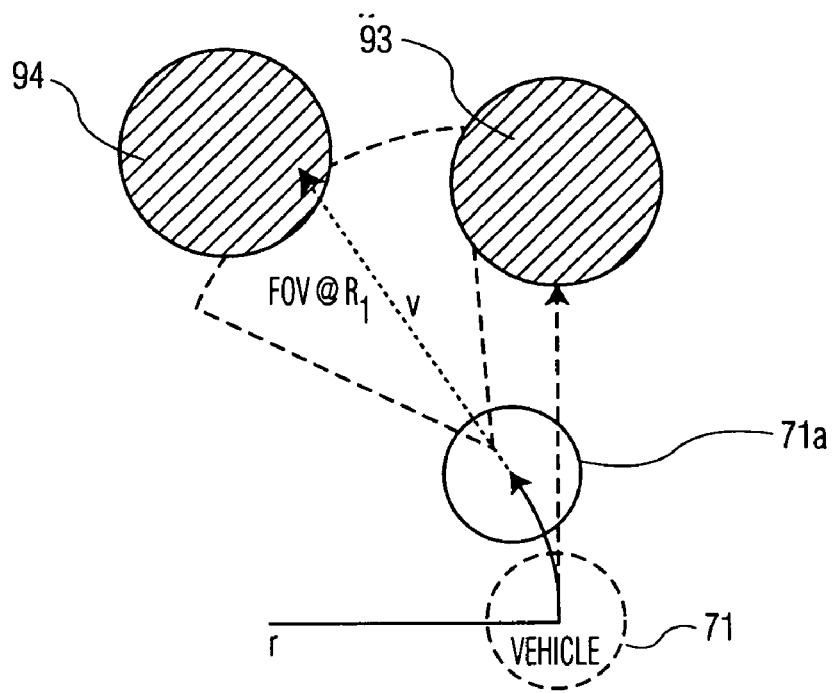
FIGS. 10A and 10B are illustrations of collision avoidance paths taken by a vehicle having a camera imaging a scene at a near range, in which a left edge of each FOV is clear of obstruction, in accordance with an embodiment of the invention.

FIG. 10A, as another example, shows vehicle 71 approaching trees 93 and 94. Tree 94 does not obscure the left edge of the FOV. The collision avoidance processor (discussed later) may interpret this as a clear space at the image edge.

Figure 10B:
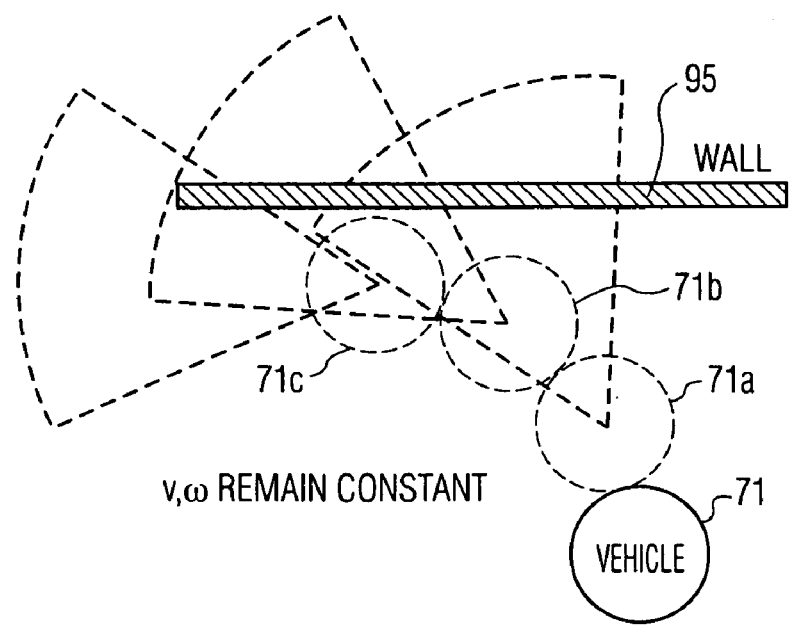

This new obstruction (seen at 71a cannot be closer than the first obstruction (tree 93), because it would have been in view prior to the start of the turn. Therefore, during a left turn, if a new obstruction has a clear space at the left edge, then it may be determined to be avoidable, and w and v may remain unchanged. FIG. 10B shows a generalization of this example. While approaching and turning to avoid wall 95, the vehicle's video image always sees an apparent clear space at the left edge of the wall, i.e. nothing is touching the left edge of the image. This is true for any FOV that is greater than some minimum value, determined by the value of $R_1$ and width of the vechicle, and is centered on the velocity vector. The minimum FOV in degrees is given by:

$$\frac{1}{2} FOV = \sin^{-1}\left(\frac{r}{2(R_1)}\right)$$

where $R_1$=near field range, and r is the turning radius. $r = R_1 - (\frac{1}{2} \text{ vehicle width})$.

Up to now, the movement of the vehicle has been limited to motion along a single horizontal plane. In case of a flying vehicle moving through trees, changes in altitude are also required in order to avoid horizontal hanging branches. The approach discussed above, may be extended to motion along a vertical plane, if the vehicle maintains its FOV centered along the vertical component, as well as the horizontal component of the velocity vector. This may be achieved with a tilt capability added to the camera system. If this is not practical, then other methods of detecting obstacles above and below the vehicle is required.

The ground terrain in the LRGV images also influences vertical motion. The ground terrain may be treated as an obstacle and the collision avoidance processor may attempt to increase altitude until the ground is no longer visible. This has an additional benefit of providing a terrain following function where the hold altitude may be set by the camera vertical FOV. Since the lower the altitude, the lower the probability of encountering a branch, the vehicle may attempt to maintain the lowest practical altitude possible. This may be achieved, while maintaining a large optical FOV, by reducing the effective FOV in the collision avoidance processor. A portion of the bottom half of the image may be ignored. This has the effect of raising the bottom edge of the image used in deciding whether to climb or descend.

Figure 11:
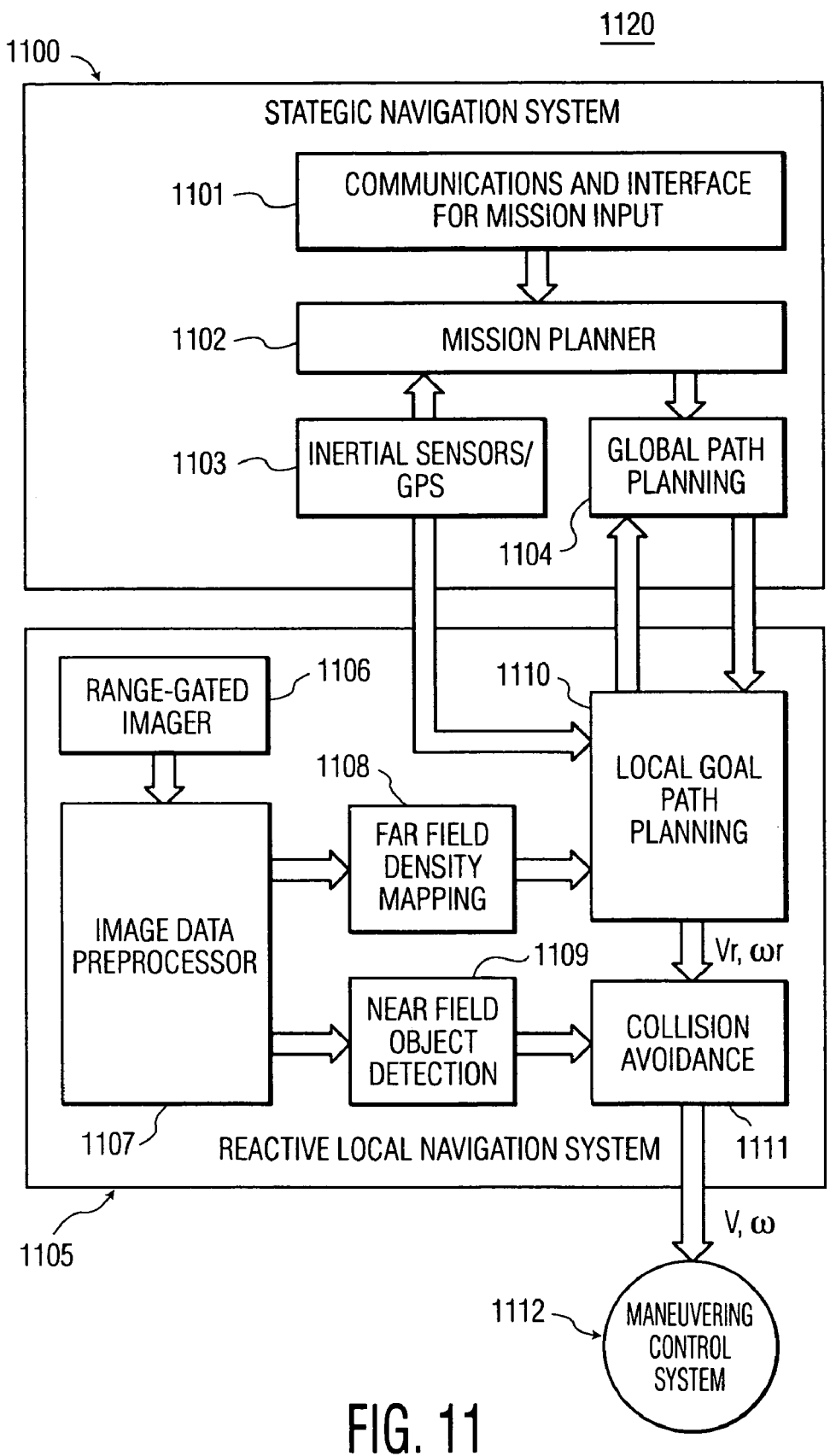
FIG. 11 is a block diagram of a navigator using limited range gated video, in accordance with an embodiment of the invention.

Referring now to FIG. 11, there is shown a block diagram of a LRGV navigator, generally designated as 1120, in accordance with an embodiment of the invention. As shown, LRGV navigator 1120 includes strategic navigation system 1100, reactive local navigation system 1105 and maneuvering control system 1112. The maneuvering control system provides stability, attitude control and maneuvering to the vehicle. It will be appreciated that the maneuvering control system depends on the airframe used for the UAV (or frame used for a ground vehicle, such as a UGV). The input signals to maneuvering control system 1112 are steering commands v and w, as shown.

Strategic navigation system 1100 provides robot processes to achieve the mission goal. As such, strategic navigation system 1100 includes communications and interface for mission input 1101, mission planner 1102, inertial sensors/GPS 1103 and global path planning module 1104. Communications and interface for mission input 1101 provides an interface with the user for Inputting mission goals and reporting mission status to the user. Based on inputs provided by inertial sensors/GPS 1103, such as vehicle present position, velocity, acceleration, attitude (roll, pitch), heading, altitude, etc., mission planner 1102 provides steering information to achieve the vehicle's mission goal (steer to a global destination).

As shown, reactive local navigation system 1105 includes range gated imager 1106, image data preprocessor 1107, far field density mapper 1108, near field object detector 1109, local goal path planner 1110 and collision avoidance processor 1111. These are discussed below.

Range gated imager (camera) 1106 provides images of the scene at the far field (far range) and near field (near range). As discussed previously, images may be taken at ranges $R_1$ and $R_2$, thereby obtaining the LRGV.

Image preprocessor 1107 converts both, near range and far range data from imager 1106 from gray scale (or color) to binary, i.e. black and white. The image preprocessor then performs edge detection on the resulting image. The far field density mapper processes the far field image, identifying local goal candidates. It performs the 'interrupted line' detection function, and maps the destiny fields in the image. Although this may be the most processing intensive block, a moderate performance processor may be adequate for this function, since the far field image only needs to be processed at rates from 3 to 10 frames per second.

The near field object detector has a simpler task of detecting when obstructions enter the near field of view. This task may be executed at the full camera frame rate, so obstructions may be identified as soon as possible. The detector may be able to distinguish between vertical and horizontal edges.

Data from far field density mapper 1108 is provided, as shown, to local goal path planner 1110 to derive local goal steering information. Data from near field object detector 1109 and local goal path planner 1110 are provided to collision avoidance module 1111 and used to make course changes in heading, velocity and altitude. As will be explained, local goal path planner 1110 modifies global path planner 1104, so that the global goal may be achieved while reducing the probability of vehicle collision.

Figure 12:
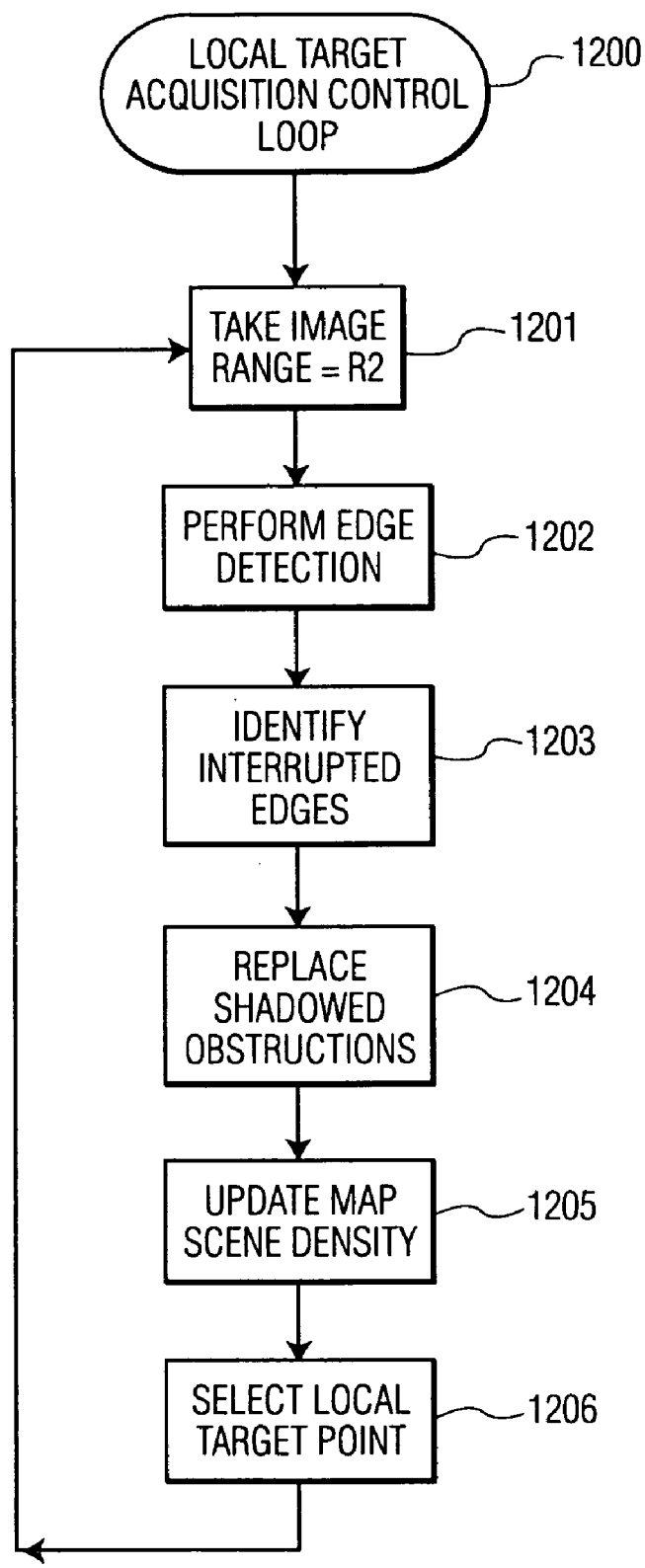
FIGS. 12 and 13 are flow diagrams depicting steps performed by the navigator of FIG. 11.
Figure 13:
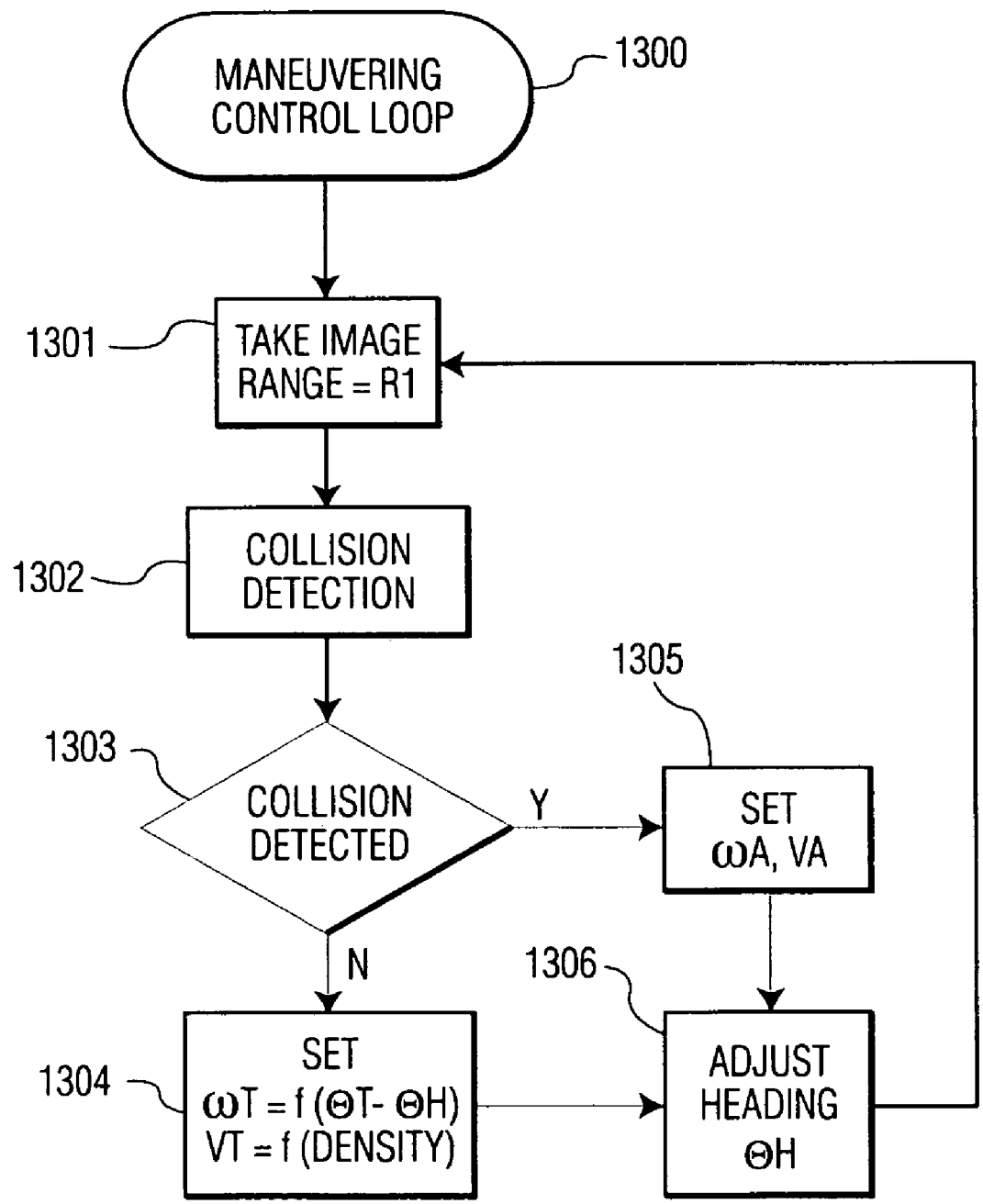

Local goal path planner 1110 includes two functions. The first function is to select local goals that reduce the probability of vehicle collision. The second function is to drive the vehicle toward the global goal (or global destination). The steps performed by the navigator are executed in two loops. A first loop is shown in FIG. 12 and is generally designated as local target acquisition control loop 1200. A second loop is shown in FIG. 13 and is generally designated as maneuvering control loop 1300.

Referring first to FIG. 12, step 1206 selects a local target aim point. The selection is based on a set of target aim points received from far field density mapper 1108 (FIG. 11). The set of target aim points includes one or more target aim points lying in a low obstacle density region in the imager's field of view (as shown, for example, in FIG. 3). The heading error, $E_\theta$, between the global goal (global destination) and each target aim point is computed. The target aim point that has a minimum error to the global goal is selected in step 1206, as the current local goal.

$E_\theta$ may be computed from the following:

$$P_T = P_{Ti} \text{ such that } E\theta = \min(E\theta i)$$

$$\theta T = f(P_T) = \theta_H \pm FOV$$

$$E\theta i = d_G \tan(\theta_G - \theta Ti)$$

where
 $\theta_G$=Heading angle to global goal
 $\theta_H$=Vehicle Heading
 $\theta_T$=Heading angle to local target (goal)
 $w_T$ Turning velocity toward local target
 $W_A$=Turning velocity for collision avoidance
 $V_T$=Linear velocity toward local target
 $V_A$=Linear velocity for collision avoidance
 $E_\theta$=Heading error to global goal
 $E_{\theta T}$=Heading error to local target
 $P_T$=Low density aim point in FOV
 $d_G$=Distance to the global goal
 i=index for each target aim point Having selected the optimal local target aim point in step 1206, the method loops back to step 1201 and obtains an image of a scene with the imager (camera) shutter opened at $R_2$ (as shown in FIG. 2) and having a FOV centered about the selected target aim point.

Having an image at range $R_2$, the method performs edge detection in step 1202 (as discussed, for example, with respect to FIG. 4). Interrupted edges may be identified in step 1203 (as discussed, for example, in FIG. 6A), and shadowed obstructions may be replaced in step 1204 (as discussed, for example, in FIG. 6B). The far field density map is updated in step 1205 and another set of target aim points is delivered, so that step 1206 may select the next optimal local target aim point.

The target aim point, which has the minimum error, is then set as the current local goal. By this process, the local goal decision loop drives toward the global goal. In general, the heading to the global goal does not lie along one of the permissible aim points provided by the far field density mapper, i.e. $E_\theta \neq 0$. As the vehicle approaches the global goal, if $\theta_G$ does not lie within the FOV, the local goal planner may not be able to close the distance to zero. If the local goal planner determines that the distance to the global goal is increasing, a heading alignment reset may be performed. This may be achieved by reducing the velocity v to near zero, while the vehicle orients itself toward the heading of the global goal by setting $\theta_H = \theta_G$. This is effective if the global goal is located in a region with few obstacles.

In heavily obstructed spaces, however, such a solution may quickly result in a local minimum in which the navigator may make no further progress toward the global goal. To resolve a local minimum, the method may add a step that forces the navigator to reposition the vehicle away from the area that produced the local minimum. This may include returning to the starting point.

Referring next to FIG. 13, there is shown maneuvering control loop 1300. Beginning at step 1301, the method obtains an image at near range $R_1$ (as shown, for example, in FIG. 5). If any obstacles are found in the FOV of the imager (steps 1302 and 1303), the method branches to step 1305 and abandons steering to the local goal, by setting the velocity to a collision avoidance velocity of $\omega_A$ and $v_A$. The heading of the vehicle is adjusted in step 1306. The method then loops back to step 1301 and obtains a new image at $R_1$. If the method, on the other hand, determines, in step 1303, that the imager's FOV is clear, steps 1304 and 1306 are entered, in which a new local goal is accepted and values for $\omega_t$ and $\theta_T$ are selected from a new set of acceptable tuples. The collision avoidance loop has the final decision for the values of w and v sent to maneuvering control system 1112 (FIG. 11).

Figure 14:
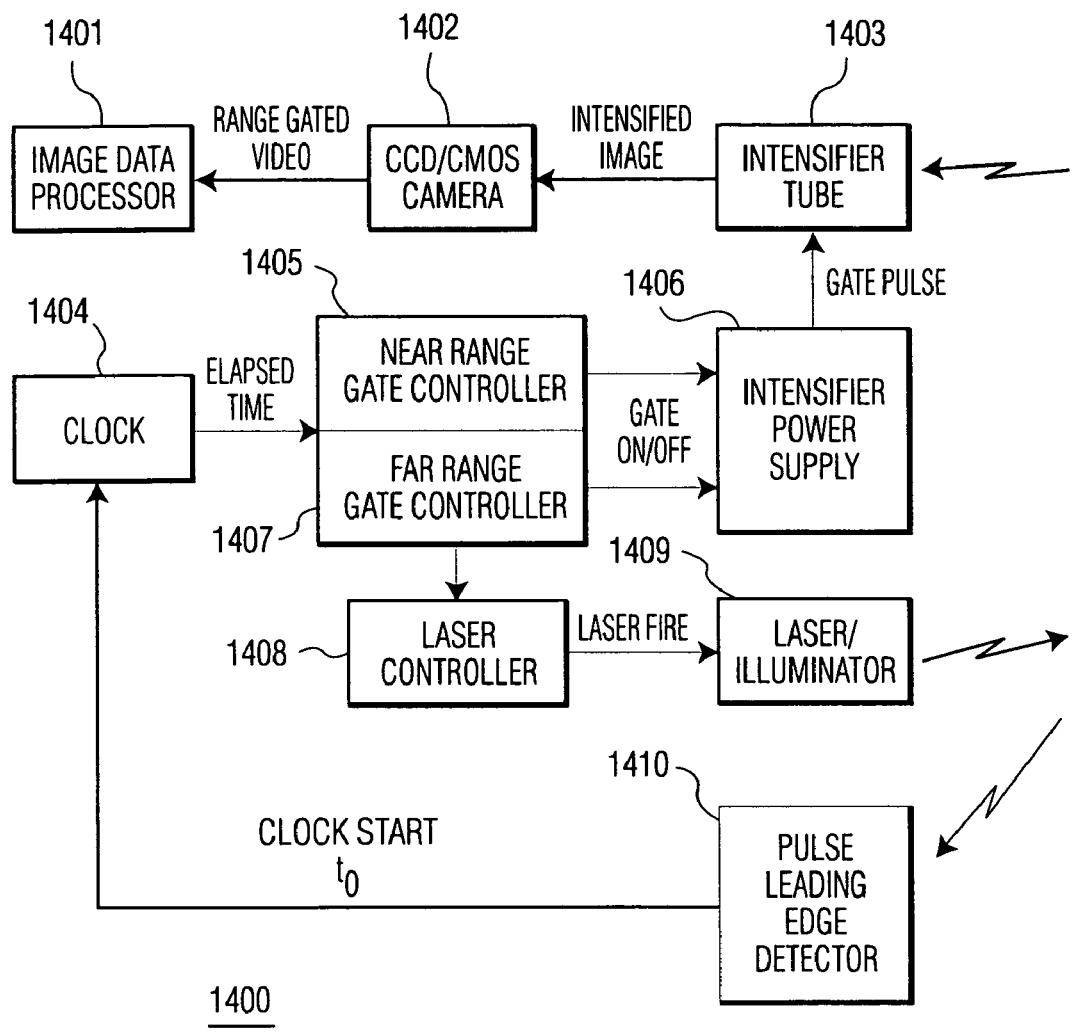
FIG. 14 is a block diagram of a limited range gated video system, in accordance with an embodiment of the invention.

Referring now to FIG. 14, there is shown a limited range gated video system, generally designated as 1400, in accordance with an embodiment of the invention. As shown, laser/illuminator 1409 transmits laser pulses, which are formed by laser controller 1408. The laser/illuminator transmits the pulses, each having leading and trailing edges. The pulses are transmitted forwardly of the vehicle to illuminate objects in the path of the vehicle. The pulses reflect off different objects located at various ranges from the laser/illuminator and are then received by intensifier tube 1403.

As shown, the intensifier tube (which may be omitted) amplifies the is received signal and provides the amplified signal to camera 1402. The camera may be, for example, a CCD or a CMOS type of camera. Camera 1402 forms the image signal and sends the signal to data processor 1401. The data processor may process the received image signal. Since the intensifier tube is gated ON/OFF by intensifier power supply 1406, camera 1402 may form images of objects at ranges between zero and $R_1$, as previously described, and may also form images of objects at ranges between $R_2$ and infinity, as previously described.

Two controllers gate ON and OFF intensifier power supply 1406. As shown, near range gate controller 1405 turns ON the intensifier power supply at range zero and turns OFF the intensifier power supply at range $R_1$. Far range gate controller 1407 turns ON the intensifier power supply at range $R_2$ and turns OFF the intensifier power supply at range $R_2$ plus a desired depth of field range, as previously described.

Pulse leading edge detector 1410 samples the leading edges of the transmitted pulses and starts clock 1404 at time $t_0$. The clock provides an elapsed time to near range gate controller 1405 and far range gate controller 1407 for, respectively, gating ON/OFF the near range gate and the far range gate.

In summary, collision avoidance, using temporally acquired spatial data, via a range-gated camera, is feasible. Acquisition of limited range gated data using an arbitrarily long illuminator pulse, as provided by the invention, may be advantageously used for collision avoidance. Navigation through a wooded area by using only $R_1$ and $R_2$ image data is logically feasible, without need for a high cost, ultra short pulsed illuminator.

There are additional advantages to LRGV of the invention. Manipulating complete spatial information of the space of regard requires significant computational processing power. A large three-dimensional matrix of scene information must be continuously updated and processed as the vehicle moves through the space. This processing requires edge detection on multiple images (which must all be updated concurrently) and 3D matrix math functions to handle translation and rotation of objects in the matrix space. This is in addition to the processing required by the navigator, which must calculate multi-vector paths around obstructions. The processing power required to handle this may be limited by both power and cost constraints. In addition, image subtraction may be encumbered by registration errors due to vibration and temporal variations in successive images. With LRGV, however, there are only two 2D images to be processed, and only the near field image requires a high frame rate. In addition, only edge detection and tracking of aim point objects are required to be processed.

In the near field frames the number of edges may be small, minimizing the processing required at high frame rates. Far field frames potentially have a large number of edges but the far field need only be updated sporadically. This places more of the computational load on the navigator, instead of the image processor. The long-range navigator algorithms need not be complex; the long-range navigator just needs to advance the vehicle to an aim point, as previously described. Near field object avoidance, however, is a more formidable problem, but may be solved using a rule-based algorithm. Fuzzy logic may be suited for this application.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. For example, LRGV is suitable for other scenarios, such as autonomously traversing caves or navigating through a building. If hovering is permissible, then cartography is feasible using LRGV. For instance, accurate range to an object may be determined, using only $R_1$, if successive images are taken while walking $R_1$ out in steps until a return is established. The same approach may be used to find a door or a wall.

What is claimed:

1. A collision avoidance system for a vehicle comprising
   a collision avoidance processor,
   a single active sensor for obtaining successive range measurements to objects along a path transversed by the vehicle, the single active sensor including
      a near range gate for obtaining a near range measurement to objects located at a range less than a first predetermined range, and
      a far range gate for obtaining a far range measurement to objects located at a range greater than a second predetermined range,
      wherein the near and far range measurements are provided to the collision avoidance processor from the single active sensor for maneuvering of the vehicle.

2. The collision avoidance system of claim 1 wherein
the active sensor includes a transmitter for transmitting pulses toward the objects, and a receiver for receiving the pulses reflected from the objects,
the near range gate is configured to be gated ON between a time of transmission of a pulse and a time of reception of the pulse reflected from an object located at a range less than the first predetermined range, and
the far range gate is configured to be gated ON at a time of reception of a pulse reflected from an object located at a range greater than the second predetermined range.

3. The collision avoidance system of claim 2 wherein
the near and far range gates are both configured to be gated OFF between a time of reception of a pulse reflected from an object located at a range greater than the first predetermined range and a time of reception of a pulse reflected from an object located at a range less than the second predetermined range.

4. The collision avoidance system of claim 2 wherein
the active sensor is configured to transmit pulses having leading and trailing edges,
the near range gate is configured to receive the leading edges of the pulses, and
the far range gate is configured to receive the trailing edges of the pulses.

5. The collision avoidance system of claim 1 wherein
the active sensor includes a laser light transmitted toward objects, and
a camera for receiving light reflected from the objects to form an image.

6. The collision avoidance system of claim 5 wherein
the laser light includes pulses having leading and trailing edges,
the near range gate is configured to receive the leading edges of the pulses and ignore the trailing edges of the pulses, and
the far range gate is configured to receive the trailing edges of the pulses and ignore the leading edges of the pulses.

7. The collision avoidance system of claim 6 wherein
the near range gate is configured to receive a leading edge of a respective pulse transmitted concurrently with a shutter opening of the camera, and
a trailing edge of the respective pulse is configured to occur after a shutter closing of the camera.

8. The collision avoidance system of claim 6 wherein
the far range gate is configured to receive a trailing edge of a respective pulse transmitted prior to a shutter opening of the camera, and
the shutter opening of the camera is configured to occur at 2 times the second predetermined range divided by the speed of light.

9. The collision avoidance system of claim 5 wherein
the first predetermined range is based on turning velocity of the vehicle, and
the second predetermined range is based on a difference between a maximum range of the camera and a depth of field of the camera.

10. A method of collision avoidance for a vehicle comprising the steps of:
(a) measuring, using a near range sate of a single sensor, a near range to objects located at a range less than a first predetermined range;
(b) measuring, using a far range sate of the same single sensor, a far range to objects located at a range greater than a second predetermined range;

(c) steering the vehicle in response to the single sensor measuring the objects located at the range greater than the second predetermined range; and
(d) modifying step (c) in response to the single sensor measuring the objects located at the range less than the first predetermined range.

11. The method of claim 10 in which
steps (a) and (b) includes transmitting pulses toward the objects, receiving reflected pulses from the objects, and measuring the range to the objects using a near range gate and a far range gate.

12. The method of claim 11 in which
step (a) includes gating the near range gate ON between a time of transmission of a leading edge of a pulse and a time of reception of a leading edge of a reflected pulse, and
step (b) includes gating the far range gate ON at a time of reception of a trailing edge of a pulse reflected off an object located at the range greater than the second predetermined range.

13. The method of claim 10 including the steps of:
(e) transmitting a laser light toward the objects; and
(f) receiving the laser light reflected from the objects with a camera.

14. The method of claim 13 in which
step (e) includes transmitting the laser light as pulses having leading edges and trailing edges, and
step (f) includes gating ON a shutter of the camera between a time of transmission of a leading edge of a pulse and a time of reception of a leading edge of a pulse reflected off an object located at the range less than the first predetermined range, and
gating ON the shutter of the camera at a time of reception of a trailing edge of a reflected pulse located at a range greater than the second predetermined range.

15. The method of claim 14 in which
step (f) includes gating OFF the shutter of the camera between a time of reception of a pulse reflected from an object located at a range greater than the first predetermined range and a time of reception of a pulse reflected from an object located at a range less than the second predetermined range.

16. The method of claim 10 in which
step (c) includes steering the vehicle to an aim point located at the range greater than the second predetermined range, and
step (d) includes modifying at least one of direction and velocity of the vehicle to avoid an object located at the range less than the first predetermined range.

17. A method of collision avoidance for a vehicle comprising the steps of:
(a) imaging, using a near range gate of a sensor, a scene located at a first predetermined range;
(b) imaging, using a far range sate of the same sensor, a scene located at a second predetermined range, the second predetermined range being greater than the first predetermined range;
(c) locating at least one low density region in the scene imaged by the sensor at the second predetermined range;

(d) selecting a low density region from low density regions located in step (c), and using the selected low density region as a steering aim point for the vehicle; and (e) modifying at least one of direction and velocity of the vehicle, while being steered toward the steering aim point, to avoid objects located by the sensor at the first predetermined range.

18. The method of claim 17 including the steps of:

(f) detecting edges of objects imaged in step (b);

(g) identifying interrupted edges of objects detected in step (f);

(h) interpolating interrupted edges of objects identified in step (g); and (i) updating a map scene density using the interpolated interrupted edges of objects; and step (c) includes locating the low density region in the scene imaged at the second predetermined range using the updated map scene density.

19. The method of claim 17 including the steps of:

(f) steering the vehicle to a global goal using a velocity vector;

(g) selecting a velocity tuple from a set of velocity tuples that satisfy the conditions of (i) steering the vehicle to the low density region selected in step (d) and (ii) steering the vehicle to the global goal using the velocity vector of step (f).

20. The method of claim 17 including the step of:

(f) detecting objects imaged in the scene located at the first predetermined range; and step (e) includes modifying the at least one of direction and velocity of the vehicle to avoid the objects detected in step (f).

* * * * *